United States Patent
Huberty et al.

(10) Patent No.: US 12,222,875 B1
(45) Date of Patent: Feb. 11, 2025

(54) INSERTION/PROMOTION VECTORS TO UPDATE REPLACEMENT DATA IN CACHES BASED ON CRITICALITY

(71) Applicant: Apple Inc., Cupertino, CA (US)

(72) Inventors: Tyler J. Huberty, Sunnyvale, CA (US); Henry A. Pellerin, San Jose, CA (US); Daniel A. Jimenez, College Station, TX (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/361,169

(22) Filed: Jul. 28, 2023

Related U.S. Application Data

(60) Provisional application No. 63/476,712, filed on Dec. 22, 2022.

(51) Int. Cl.
*G06F 12/123* (2016.01)

(52) U.S. Cl.
CPC .... *G06F 12/123* (2013.01); *G06F 2212/1021* (2013.01)

(58) Field of Classification Search
None
See application file for complete search history.

(56) References Cited

U.S. PATENT DOCUMENTS

| | | | | |
|---|---|---|---|---|
| 11,294,829 | B2* | 4/2022 | Inoue | G06F 12/124 |
| 2011/0072218 | A1* | 3/2011 | Manne | G06F 12/123 |
| | | | | 711/E12.001 |
| 2015/0010143 | A1* | 1/2015 | Yang | G06F 3/068 |
| | | | | 380/28 |
| 2018/0081811 | A1* | 3/2018 | Al Sheikh | G06F 12/0848 |
| 2020/0210349 | A1* | 7/2020 | Dolev | G06F 12/126 |

OTHER PUBLICATIONS

S. Khan and D. A. Jiménez, "Insertion policy selection using Decision Tree Analysis," 2010 IEEE International Conference on Computer Design, Amsterdam, Netherlands, 2010, pp. 106-111, doi: 10.1109/ICCD.2010.5647608. (Year: 2010).*

Moinuddin K. Qureshi et al. 2007. Adaptive insertion policies for high performance caching. In Proceedings of the 34th annual international symposium on Computer architecture (ISCA '07). Association for Computing Machinery, New York, NY, USA, 381-391. https://doi.org/10.1145/1250662.1250709 (Year: 2007).*

(Continued)

*Primary Examiner* — Edward J Dudek, Jr.
*Assistant Examiner* — Ralph A Verderamo, III
(74) *Attorney, Agent, or Firm* — Kowert, Hood, Munyon, Rankin & Goetzel, P.C.; Dean M. Munyon

(57) ABSTRACT

A cache memory supports a plurality of insertion/promotion vectors (IPVs) and a replacement control circuit configured to update replacement data for the cache memory based on the plurality of IPVs. In one embodiment, the IPV is selected for a given request based a criticality status of a cache line accessed by the given request. For example, cache lines deemed important or critical for performance reasons may be replaced less frequently via a first IPV, while non-critical cache lines are replaced more frequently via a second IPV.

20 Claims, 11 Drawing Sheets

(56) References Cited

OTHER PUBLICATIONS

F. K. H. Abadi and S. Safari, "Performance and area aware replacement policy for GPU architecture," 2014 4th International Conference on Computer and Knowledge Engineering (ICCKE), Mashhad, Iran, 2014, pp. 497-503, doi: 10.1109/ICCKE 2014.6993378. (Year: 2014).*

D. A. Jiménez, "Insertion and promotion for tree-based PseudoLRU last-level caches," 2013 46th Annual IEEE/ACM International Symposium on Microarchitecture (MICRO), Davis, CA, USA, 2013, pp. 284-296. (Year: 2013).*

E. Teran, Y. Tian, Z. Wang and D. A. Jiménez, "Minimal disturbance placement and promotion," 2016 IEEE International Symposium on High Performance Computer Architecture (HPCA), Barcelona, Spain, 2016, pp. 201-211, doi: 10.1109/HPCA.2016.7446065. (Year: 2016).*

Yuejian Xie and Gabriel H. Loh. 2009. PIPP: promotion/insertion pseudo-partitioning of multi-core shared caches. SIGARCH Comput. Archit. News 37, 3 (Jun. 2009), 174-183. https://doi.org/10.1145/1555815.1555778 (Year: 2009).*

S. T. Srinivasan, R. Dz-Ching Ju, A. R. Lebeck and C. Wilkerson, "Locality vs. criticality," Proceedings 28th Annual International Symposium on Computer Architecture, Gothenburg, Sweden, 2001, pp. 132-143, doi: 10.1109/ISCA.2001.937442. (Year: 2001).*

\* cited by examiner

|  | Hit/ Miss 510 | Hit loc 520 | Cache fill data 530 | Cache data 26 ||||||||  Replacement data 32 ||||||||
|---|---|---|---|---|---|---|---|---|---|---|---|---|---|---|---|---|---|---|
|  |  |  |  | 0 | 1 | 2 | 3 | 4 | 5 | 6 | 7 | 0 | 1 | 2 | 3 | 4 | 5 | 6 | 7 |
|  |  |  |  | A | B | C | D | E | F | G | H | A | B | C | D | E | F | G | H |
| 511A | hit | E | N/A | A | B | C | D | E | F | G | H | E | A | B | C | D | F | G | H |
| 511B | hit | E | N/A | A | B | C | D | E | F | G | H | E | A | B | C | D | F | G | H |
| 511C | miss | N/A | I (H evicted) | A | B | C | D | E | F | G | I | I | E | A | B | C | D | F | G |
| 511D | hit | F | N/A | A | B | C | D | E | F | G | I | F | I | E | A | B | C | D | G |
| 511E | hit | G | N/A | A | B | C | D | E | F | G | I | G | F | I | E | A | B | C | D |
| 511F | miss | N/A | J (D evicted) | A | B | C | J | E | F | G | I | J | G | F | I | E | A | B | C |
| 511G | hit | A | N/A | A | B | C | J | E | F | G | I | A | J | G | F | I | E | B | C |

FIG. 5A

|  | Hit/ Miss 510 | Hit loc 520 | Cache fill data 530 | Cache data 26 |||||||| Replacement data 32 ||||||||
|---|---|---|---|---|---|---|---|---|---|---|---|---|---|---|---|---|---|---|
|  |  |  |  | 0 | 1 | 2 | 3 | 4 | 5 | 6 | 7 | 0 | 1 | 2 | 3 | 4 | 5 | 6 | 7 |
|  |  |  |  | A | B | C | D | E | F | G | H | A | B | C | D | E | F | G | H |
| 512A | hit | E | N/A | A | B | C | D | E | F | G | H | E | A | B | C | D | F | G | H |
| 512B | hit | E | N/A | A | B | C | D | E | F | G | H | E | A | B | C | D | F | G | H |
| 512C | miss | N/A | I (H evicted) | A | B | C | D | E | F | G | I | E | A | B | I | C | D | F | G |
| 512D | hit | F | N/A | A | B | C | D | E | F | G | I | E | A | B | I | B | F | D | G |
| 512E | hit | G | N/A | A | B | C | D | E | F | G | I | E | A | B | I | G | C | F | D |
| 512F | miss | N/A | J (D evicted) | A | B | C | J | E | F | G | I | E | A | B | J | I | G | C | F |
| 512G | hit | G | N/A | A | B | C | J | E | F | G | I | E | A | B | J | I | C | G | F |

FIG. 5B

INSERTION/PROMOTION VECTORS TO UPDATE REPLACEMENT DATA IN CACHES BASED ON CRITICALITY

This application claims priority to U.S. Provisional Pat. Appl. No. 63/476,712, entitled "Insertion and Promotion Vector Improvements," filed on Dec. 22, 2022, which is incorporated by reference herein in its entirety.

BACKGROUND

Technical Field

Embodiments described herein are related to caches and, more particularly, to replacement policies in caches.

Description of the Related Art

Caches are high speed memories used in/near processors and other digital circuits to store recently accessed and/or prefetched data from a main memory system such as dynamic random-access memory (DRAM) of various types. Caches generally have lower capacity than DRAMs but also have significantly lower access latency. Accordingly, processor accesses that hit in the cache experience lower latency, reducing the effective memory latency for the processor accesses and typically improving performance of the processors.

A cache is a finite resource and thus, when the cache is full and additional data is presented for caching, a mechanism to select which cached data to replace is implemented. The caches can have different arrangements that determine how many cache storage locations are available for a given memory address that corresponds to the data. For example, a direct-mapped cache has one storage location available for a given address, based on a subset of the given address. In this case, the replacement mechanism is merely to replace the data in the one storage location with the new data. Another example is a set associative cache, arranged as a two-dimensional array of cache storage locations. The memory address (e.g., a subset of the address, as with the direct-mapped cache) is used to select a row of the array, and the cache storage locations in that row are possible locations for caching data for the memory address. A fully associative cache allows any location to be selected for a given address.

When more than one storage location is eligible to cache data, a replacement mechanism is used to select one of the entries. Data currently in the selected entry, if any, is replaced with the new data. Various replacement mechanisms (or schemes) exist. For example, the least recently used (LRU) paradigm tracks how recently the cache locations in a given row were accessed. When a given cache location is accessed, it is promoted to most recently used (MRU) and the remaining cache locations in the row have their positions adjusted from second most recently used to least recently used. When a replacement is made, the least recently used location is selected. Variations of the LRU mechanism have been created as well to simplify the updates for timing reasons. The above mechanism is often referred to as "true LRU" and variations are referred to as "pseudo-LRU." Other mechanisms include random replacement, first-in, first-out (FIFO) replacement, etc. These mechanisms tend to be less effective (e.g., leading to the replacement of later-needed data) in the presence of aggressive prefetchers.

BRIEF DESCRIPTION OF THE DRAWINGS

The following detailed description refers to the accompanying drawings, which are now briefly described.

FIGS. 5A-B illustrate examples of how cache data and replacement data can change in response to code sequences.

DETAILED DESCRIPTION

Figure 1:
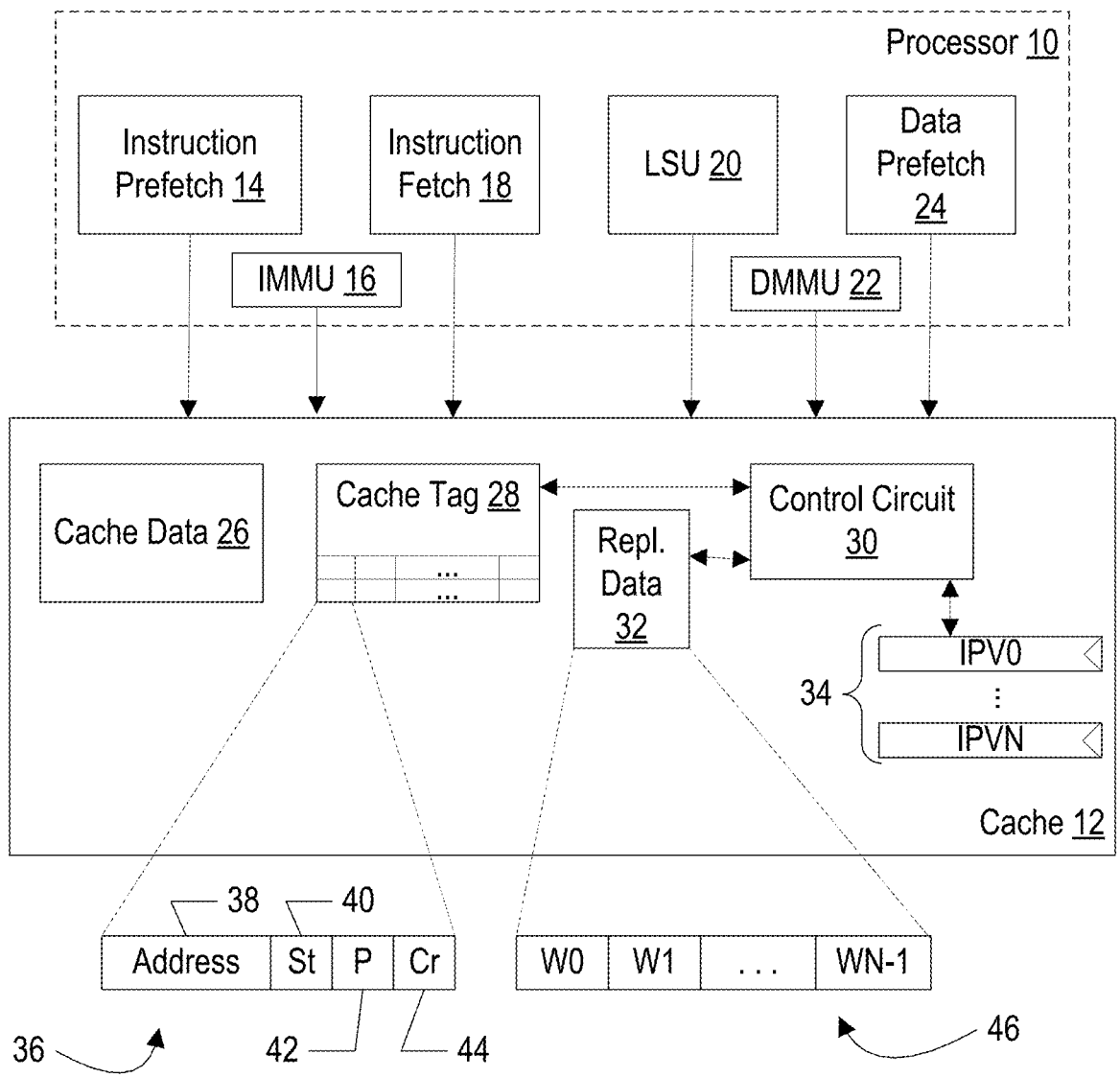
FIG. 1 is a block diagram of one embodiment of a processor and a cache.

In an embodiment, a cache includes a replacement control circuit configured to maintain replacement data with respect to cache lines stored in a cache. The replacement data may rank the cache lines, providing a replacement data value for each cache line that specifies its position in line for replacement. The cache may be programmable with a plurality of insertion/promotion vectors (IPVs), and the replacement control circuit may be configured to update the replacement data based on the IPVs. More particularly, the IPVs may specify a promotion value for each current replacement data value, as well as an insertion value that a cache line that misses the cache uses as an initial replacement data value. The IPVs may have a vector element for each value that the replacement data for a given cache line can take on. For example, if N cache line storage locations in the cache are eligible to store a given cache line, the replacement data value may be between zero and N-1. When an access occurs to a cache line stored in the cache ("cache hit"), the replacement control circuit may read the current replacement data value corresponding to the hit cache line and may look up the vector element in the IPV that corresponds to the current replacement data value. The vector element may indicate the promotion value, which is the new value for the replacement data value corresponding to the hit cache line. That is, the replacement data may be updated to the promotion value. Other values in the same replacement data that are between the promotion value and the current value may be updated as well so that each possible value in the replacement data is assigned to a respective cache line.

As mentioned above, there are a plurality of IPVs. One of the IPVs may be selected ("a selected IPV") to determine an update to the replacement data. That is, the update may be based on the selected IPV. In an embodiment, the selected IPV may be chosen based on whether or not the data is "critical." Typically, the criteria used to determine criticality identify the cache lines that, when missed, have a greater impact on processor performance than other cache lines being missed. Each cache line may thus have a criticality value that specifies its level of criticality—this criticality value may be stored in the cache tag, for example. In some cases, the criticality value is binary and indicates whether a cache line is critical or non-critical. Alternatively, the criticality value may be more granular and may indicate multiple levels of criticality where some cache lines are more critical than other (critical) cache lines. As used herein, "criticality level" of a particular cache line is some value maintained by the computing device that is indicative of that cache line's potential impact on performance.

The inventors recognized for example that if all cache lines are subject to the same replacement policy, a livelock condition might occur where certain (critical) cache lines repeatedly miss and are thus frequently refilled. To reduce the possibility of cache livelock and other performance issues, the inventors propose the use of different IPVs, depending on the criticality of the corresponding cache line. Such an approach can cause cache lines deemed critical to be replaced less frequently. Accordingly, different IPVs may be used for critical data versus non-critical data. For example, in some embodiments, critical cache lines are replaced less frequently via a first IPV, while non-critical cache lines are replaced more frequently via a second IPV. In another embodiment, there may be an IPV for critical data, and non-critical data may use one or more other IPVs based on other attributes of the request (e.g., a prefetch field). There may be different IPVs for different levels of criticality in embodiments which support multiple levels of criticality. In another embodiment, different levels of criticality may share an IPV.

When a cache miss occurs, the replacement data may be consulted and a currently stored cache line may be selected for replacement (or "eviction"). The evicted cache line may be selected as the cache line having a fixed, specific value of the replacement data. In general, when the replacement data value of a given cache line is updated to a promotion value, the replacement data values of other caches lines between the promotion position and the original position may be modified by one position, moving the replacement data values closer to the eviction position. The descriptions of FIGS. 4A-B and 5A-B below provide examples of different replacement policies. In an embodiment, a given IPV may support a "demotion" in which the promotion position is nearer the eviction position than the original position. If a demotion occurs, the replacement data values of cache lines between the original position and the promotion position may be modified by being moved one position farther from the eviction position.

The use of IPVs thus provides a flexible replacement mechanism, permitting virtually any desired behavior in the retention and replacement of cache lines in the cache. IPVs may be discovered in some implementations using a genetic algorithm to evolve the IPVs based on the workloads of a system. The resulting cache behavior may exhibit high performance (e.g., high hit rates, low average memory latency, etc.), in some embodiments. Furthermore, if more effective IPVs are discovered, then the new IPVs may be programmed into the cache to replace the previous IPVs.

The replacement data may be maintained separately for each group of cache lines that share eligibility to store a given cache line. For example, in a set associative cache, replacement data may be maintained separately for each set of cache line storage locations (ways 0 to N-1). In a fully associative implementation, there may be one set of replacement data that covers all of the cache line storage locations.

In an embodiment, a cache may comprise a cache memory configured to store a plurality of cache lines; a plurality of clocked storage devices configured to store a plurality of insertion and promotion vectors (IPVs); and a replacement control circuit coupled to the cache memory and to the plurality of clocked storage devices. The replacement control circuit may be configured to maintain replacement data corresponding to the cache memory based on the plurality of IPVs. The replacement control circuit may be configured to select a selected IPV of the plurality of IPVs to update the replacement data. For example, the replacement data control circuit may be configured to select the selected IPV based on one or more attributes of a given request to the cache. The replacement data control circuit may be configured to select the selected IPV based on the selected IPV providing relatively higher performance compared to other ones of the plurality of on a given workload. The replacement data control circuit may be configured to dynamically change the selected IPV based on changes in performance of the plurality of IPVs due to changes in the workload.

FIG. 1 is a block diagram of one embodiment of a system including a processor 10 and a cache 12 coupled to the processor 10. In the illustrated embodiment, the processor 10 includes a plurality of request circuits including an instruction prefetch circuit 14, an instruction memory management unit (IMMU) 16, an instruction fetch circuit 18, a load/store unit (LSU) 20, a data MMU (DMMU) 22, and a data prefetch circuit 24. Each of the request circuits 14, 16, 18, 20, 22, and 24 is configured to issue requests to the cache 12, illustrated by the arrows in FIG. 1. It is noted, however, that the arrows are not meant to imply that the circuits 14, 16, 18, 20, 22, and 24 have independent paths to the cache 12 (although such an embodiment is possible). Various implementations may combine requests from the circuits 14, 16, 18, 20, 22, and 24 using arbitration between the requests from different request sources when the requests are combined. The cache 12 may be implemented with the processor 10, may be private to the processor 10, or may be shared one or more other processors 10, in various embodiments. The cache 12 may represent separate instruction and data caches, or a shared cache, in various embodiments.

In the illustrated embodiment, the cache 12 includes a cache memory (e.g., cache data memory 26 and cache tag memory 28), a replacement control circuit 30, a replacement data memory 32, and a plurality of clocked storage devices 34 configured to store IPVs. The replacement control circuit 30 is coupled to the clocked storage devices 34, the replacement data memory 32, and the cache tag memory 28 in one embodiment.

The replacement data memory 32 may be constructed from any form of memory (random access memory (RAM) such as static RAM (SRAM), an array of flops, registers, etc.). The replacement data memory 32 may have the same number of rows as the cache tag memory 28/cache data memory 26 and may store the replacement data for the cache line storage locations in the row. For example, in a set associative cache, the rows may correspond to sets in the cache and ways in the set may have corresponding replacement data values in the replacement data for the row. An example entry 46 of the replacement data entry is shown in exploded view in FIG. 1, and includes the replacement data for way 0 (W0), the replacement data for way 1 (W1), etc. through the replacement data for way N-1 (WN-1). A portion of the address of the request may serve as an index into the cache tag memory 28/cache data memory 26 and the replacement data memory 32. The replacement control circuit 30 may receive the replacement data, and may select an IPV from the IPVs in the clocked storage devices 34. The replacement control circuit 30 may be configured to determine an update to the replacement data based on the selected IPV, the current replacement data, and whether or not the request is a cache hit. The replacement control circuit 30 may be configured to write the updated replacement data back to the replacement data memory 32. This process is described in further detail below with respect to FIGS. 5A-B.

In an embodiment, a criticality level of a cache line may cause selection of different IPVs. As previously noted, cache lines may be viewed as critical if a cache miss on the cache line tends to have more impact on the performance of executing code than other cache misses. Viewed in another way, the cache miss may be critical if the instruction that resulted in the miss is on the "critical path" in the executing code, so that execution progress is rapidly stalled waiting for a return of the missing data. Retaining critical cache lines in the cache 12 may be more desirable than retaining non-critical lines. By having a different IPV for critical cache lines, the update to the replacement data of critical cache lines (and the insertion point) may differ from those of non-critical cache lines, which may allow critical cache lines to remain higher in the ranking represented by the replacement data than non-critical cache lines (and thus less likely to reach the eviction value and get replaced).

In one embodiment, at the time a missing cache line is filled into the cache 12, a criticality value may be assigned to the cache line. For example, the cache tags in the cache 12 may include a field for the criticality value. An example cache tag 36 is shown in exploded view in FIG. 1 and may include a tag field 38, a state field (St) 40, a prefetch field (P) 42, and a criticality field (Cr) 44. The criticality field 44 may store the criticality value for the cache line. The criticality value may indicate non-critical status, or critical status. In some embodiments, there may be more than one level of critical status. There may be an IPV for critical status, and in some embodiments, there may be multiple IPVs for the different levels of critical status. Non-critical cache lines may have one or more IPVs based on various other attributes, in different embodiments.

The cache 12 may consider a variety of factors in assigning the criticality values to cache lines. For example, fills that are for table walk requests from the MMUs 16 and 22 may be categorized as critical. A TLB miss may affect additional instruction fetches or load/store requests, since a translation covers a fairly large amount of data and code sequences tend to access data that is near other recently accessed data. For example, a page may be 4 kilobytes in size, 16 kilobytes in size, or even larger such as 1 Megabyte or 2 Megabytes. Any page size may be used.

Another factor that the cache may consider for criticality for loads is whether or not a load is at the head of a load queue in the LSU 20 when the fill for the load occurs.

In another embodiment, a number of the oldest outstanding loads may be detected as critical (e.g., more than one entry at the head of the load queue may be a source of criticality for a fill). A load at the head of the load queue may be the oldest load outstanding in the processor 10. Thus, it is likely that the load is stalling the retirement of other completed instructions or there are a number of instructions stalled due to dependency on the load data (either direct or indirect). Fills for loads that are at the head of the load queue may be assigned critical status. Similarly, if a fill is for an instruction fetch request and it is the oldest fetch request outstanding from the instruction fetch circuit 18, then instruction fetching is likely to be stalled awaiting the instructions. Such instruction fetches may be assigned critical status (or multiple ones of the oldest outstanding instruction fetches may lead to critical status for the corresponding fills). Other embodiments may include additional factors within a given processor 10, or subsets of the above factors and other factors, as desired. Cache lines not assigned critical status may be assigned non-critical status.

In various embodiments, the criticality values assigned to cache lines may be maintained while the cache lines remain valid in the cache hierarchy. The criticality value may be propagated with the cache line when it is evicted from the cache 12 and is transmitted to other levels of cache (e.g., a memory cache implemented in a memory controller). Subsequently, if a cache line previously cached by the cache 12 is reaccessed, the cache line may be provided as a fill to the cache 12, and the criticality value previously associated with the cache line may also be provided. The cache 12 may assign the previous criticality value provided with the cache line, unless other factors from the processor 10 that generated the reaccess of the cache line indicate an upgrade to critical status or to a higher level of critical status. For example, a non-critical cache line may be filled with non-critical status unless it is assigned critical status at the time of the fill for reaccess (e.g., the fill is for a load at head of the load queue, an instruction fetch that is the oldest outstanding from the instruction fetch circuit 18, or a MMU table walk request). A cache line having critical status may be filled as critical. In embodiments that implement multiple levels of criticality status, a cache line having previous critical status that is also currently indicated as critical based on the above factors (head of the load queue, oldest outstanding instruction cache miss, or MMU table walk request) may be assigned a higher level of critical status.

The prefetch field 42 may indicate whether or not the cache line was filled into the cache 12 due to a prefetch. The prefetch field 42 may indicate prefetch until the cache line is accessed by a demand access, and then the prefetch field may be changed to non-prefetch. The state field 40 may store a state of the cache line (e.g., valid vs. invalid, and/or various coherency states if cache coherency is employed). The tag field 38 may store the portion of the address of the cache line that is not used in the index, for comparison to the corresponding portion of the address of a request to detect a cache hit in the cache 12.

The clocked storage devices 34 may be any type of digital storage that captures data and provides the data as output based on a clock signal. For example, clocked storage devices may include registers, flops, latches, etc.

The instruction fetch circuit 18 may generally include the circuitry configured to fetch instructions for execution. The instruction fetch circuit 18 may include circuitry to speculate, allowing a speculative path to be fetched and executed (e.g., branch prediction circuitry). The instruction fetch circuit 18 may include an instruction cache, which may implement the IPVs and replacement data maintenance operation described for the cache 12. The instruction prefetch circuit 14 may be configured to prefetch instructions that are predicted to be fetched via the instruction fetch circuit 18. Any prefetch mechanism or mechanisms may be implemented.

The LSU 20 may include the circuitry to execute load and store operations derived from the fetched instructions. The circuitry may include address generation, order enforcement circuitry etc. A data cache may be included in or near the LSU 20 as well, and may also implement the IPVs and replacement data maintenance operation described for the cache 12 as well. The data prefetch circuit 24 may implement any prefetch mechanism or mechanisms to predict data that will subsequently be accessed via the LSU 20 and prefetch that data into the cache 12.

The IMMU 16 may provide address translations for instruction fetch addresses and instruction prefetch address.

Similarly, the DMMU 22 may provide address translations for the load/store addresses and data prefetches. The MMUs 16 and 22 may include translation lookaside buffers (TLBs) that cache translations, and may optionally include one or more level 2 (L2) TLBs, as well as table walk circuitry to perform the translation table reads to obtain a translation for an address that misses in the TLBs. The MMUs 16 and 22 may transmit the table walk reads to the cache 12.

Generally, a processor may include any circuitry and/or microcode configured to execute instructions defined in an instruction set architecture implemented by the processor. Processors may encompass processor cores implemented on an integrated circuit with other components as a system on a chip (SOC) or other levels of integration. Processors may further encompass discrete microprocessors, processor cores and/or microprocessors integrated into multichip module implementations, processors implemented as multiple integrated circuits, etc. Processors may have any microarchitecture and implementation, including in order and out of order processors, speculative and non-speculative, superscalar and/or pipelined/superpipelined, etc.

Figure 2:
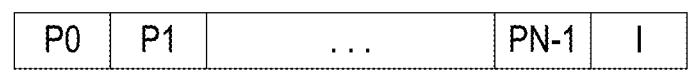
FIG. 2 is a block diagram of one embodiment of an insertion/promotion vector (IPV) in greater detail.

FIG. 2 is a block diagram of one embodiment of an IPV 50. The IPV 50 includes a vector of promotion values (P0 to PN-1), and an insertion value (I). As mentioned previously, some embodiments may also include an eviction value identifying the replacement data value to be evicted. The replacement data ranks a plurality of cache lines from most replaceable to least replaceable. The IPV comprises a vector element for each position in the rank (e.g., each replacement data value) and identifies a promotion position in the rank when a cache line having the rank (replacement data value) is accessed. For example, if the current replacement data value is 0, P0 is selected as the promotion value/position; if the current replacement data value is 1, P1 is selected as the promotion value/position. Similarly, if the current replacement value is N-1, this causes PN-1 to be selected as the promotion value/position. The replacement control circuit 30 may be configured to update the replacement data to promote the cache line that is hit by the request to the promotion position specified by the vector element corresponding to the cache line's current replacement data value.

In an embodiment, the cache 12 may be partitioned into two or more partitions having different access latencies (e.g., a "near" partition and a "far" partition, where the access latency to the far partition is at least one clock cycle longer than the near partition). In such an embodiment, the cache data most likely to be accessed (e.g., farthest from the eviction position in the replacement data) is cached in the near partition and the less likely to be accessed data is cached in the far partition. For such embodiments, the boundary between the near and far partitions in the replacement data is important because when a cache line crosses the boundary, data in the near and far partitions is moved. The IPVs may provide the flexibility to handle partitioned caches as well. For example, because the transitions between positions are indicated by the IPVs, identifying well-performing IPVs in a genetic algorithm that is aware of the partitions may also lead to optimization of the migrations policies. Alternatively, separate IPVs may be developed for each partition and a separate migration policy may be used.

Figure 3:
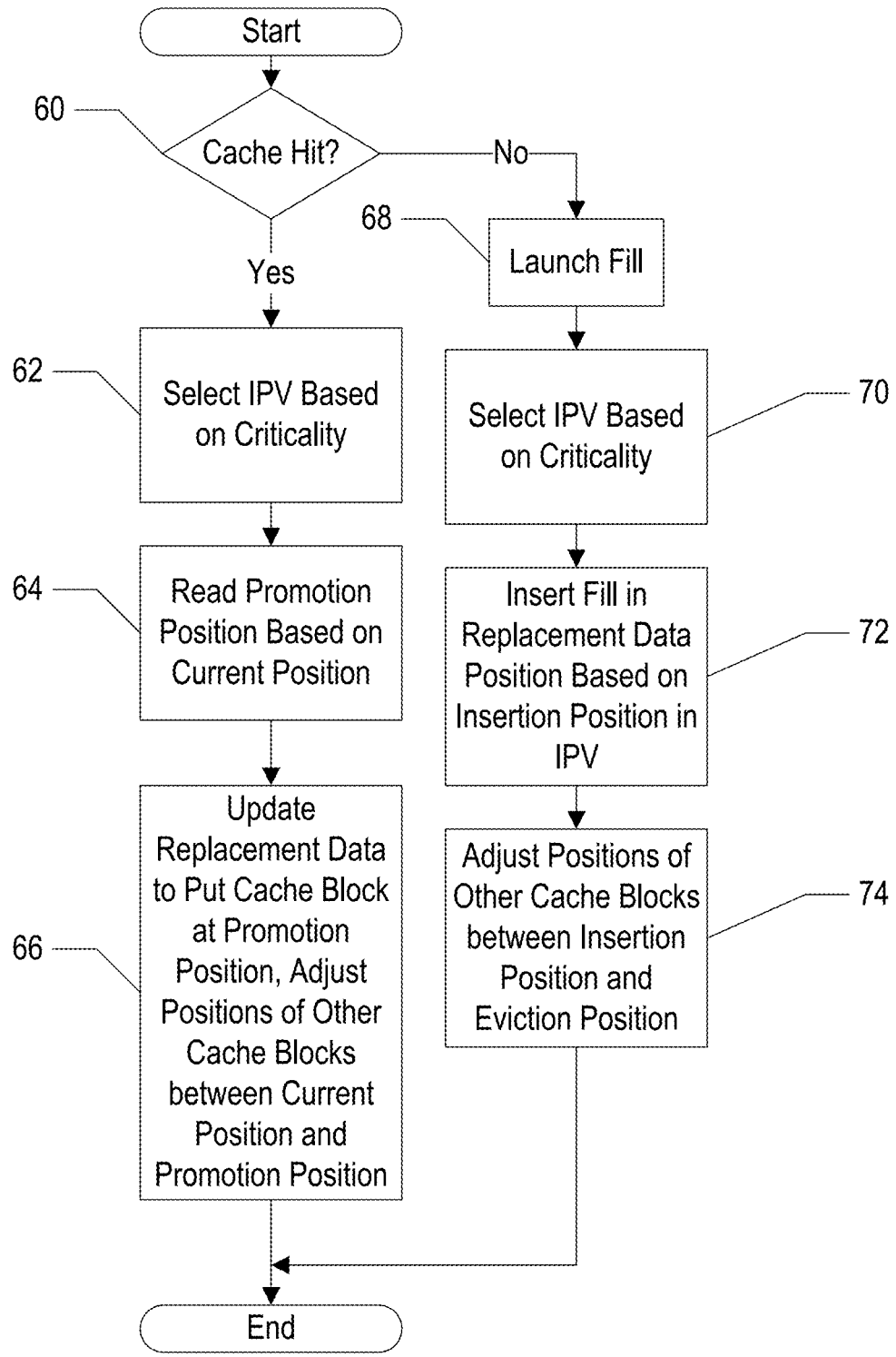
FIG. 3 is a flowchart illustrating update of replacement data according to one embodiment.

FIG. 3 is a flowchart illustrating one embodiment of the cache 12/replacement control circuit 30 to update the replacement data for a cache access. While the blocks are shown in a particular order for ease of understanding, other orders may be used. Blocks may be performed in parallel in combinatorial logic in the cache 12/replacement control circuit 30. Blocks, combinations of blocks, and/or the flowchart as a whole may be pipelined over multiple clock cycles.

If the request is a cache hit (decision block 60, "yes" leg), the replacement control circuit 30 may select the IPV based on the criticality status of the cache line (block 62). The replacement control circuit 30 may read the promotion position from the IPV based on the current replacement data value (the current position of the cache line in the replacement data) (block 64). The replacement data circuit 30 may update the replacement data to put the hitting cache block at the promotion position and may adjust the replacement data values of other cache blocks having replacement data values/positions between the current position and the promotion position (e.g., decrementing the values if zero is the eviction position or incrementing the values if the N-1 is the eviction position) (block 66).

If the request is a cache miss (decision block 60, "no" leg), the cache 12 may launch a fill request to obtain the missing cache line (block 68). The replacement control circuit 30 may select an IPV based on the criticality status of the cache line at the time of the fill (block 70) and may insert the fill in the replacement data position indicated by the insertion position of the IPV (block 72). The replacement control circuit 30 may adjust the replacement data values of other cache blocks having replacement data values/positions between the insertion position and the eviction position (e.g., decrementing the values if zero is the eviction position or incrementing the values if the N-1 is the eviction position) (block 74).

Figure 4A:
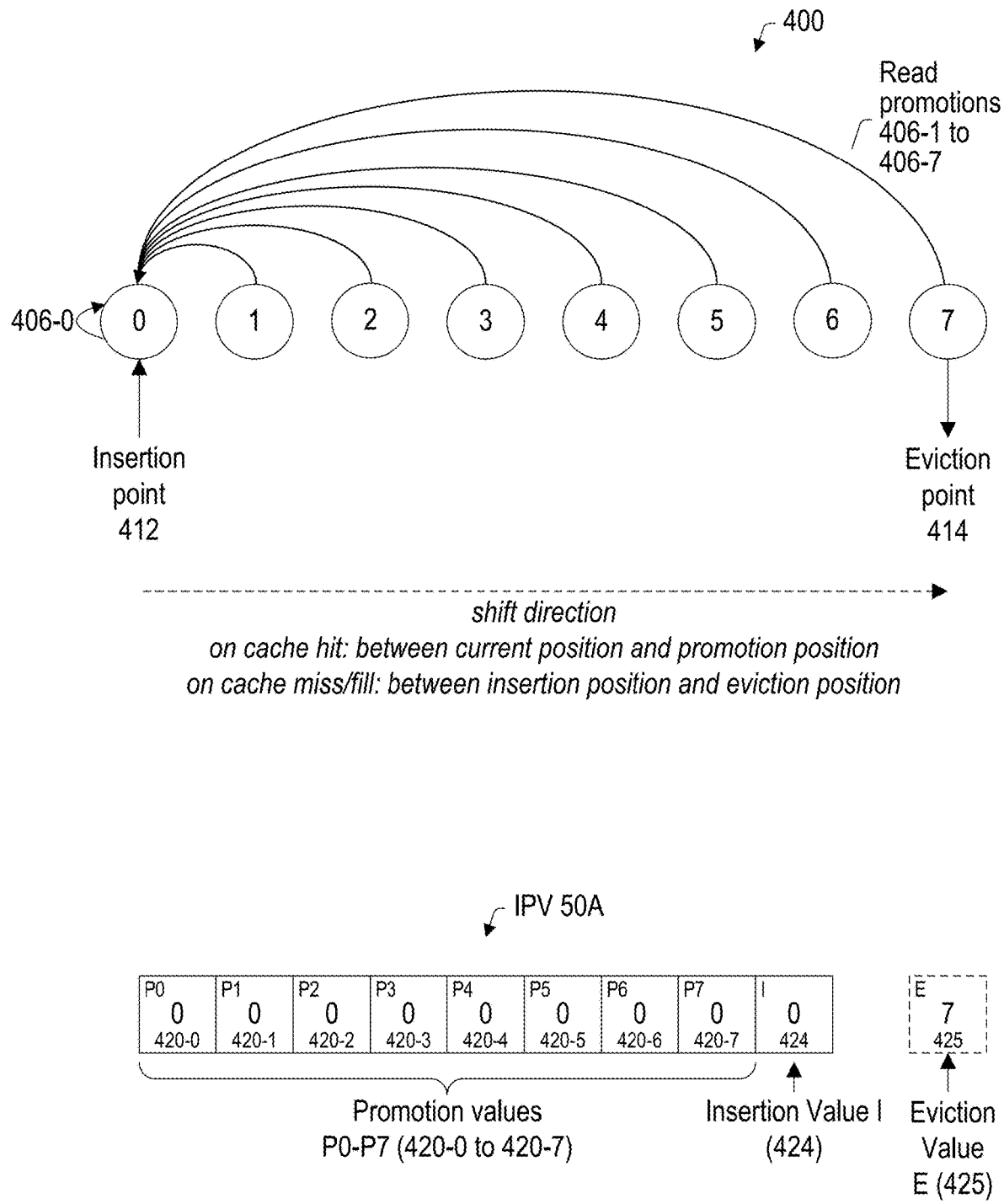
FIGS. 4A-B illustrate exemplary transition paths and insertion/promotion vectors.

FIG. 4A illustrates exemplary transition paths and an insertion/promotion vector for an LRU replacement scheme.

Transition graph 400, in the illustrated embodiment, is a representation of insertion and promotion operations for an accessed cache line according to a LRU replacement scheme. Each node 0-7 in graph 400 represents a cache line at a position 0-7, where position 0 indicates MRU status, positions 1-6 indicate decreasing recently used statuses, and position 7 indicates LRU status. Each position 0-7 thus represents a "rank" of the corresponding node's replaceability: the node at position 0 is the least replaceable, while the node at position 7 is the most replaceable.

As shown, the node that corresponds to a hit cache line is promoted according to its respective read promotion 406-0 to 406-7 (shown here as directed edges of the transition graph). Each read promotion 406 represents a transition from an initial position of the cache line to the MRU position (position 0) of the cache line. For example, read promotion 406-3 indicates that a cache hit at position 3 will cause data for the corresponding node to be promoted from position 3 to position 0. Note that other replacement schemes may be modeled using a transition graph with different promotions, as will be discussed in more detail with respect to FIG. 4B.

In response a cache miss, fill data corresponding to the missed cache line is inserted into graph 400 at insertion point 412. In the LRU replacement scheme, the insertion point 412 is node 0, the MRU position. Eviction point 414, on the other hand, is node 7, the LRU position. Note that while the LRU replacement scheme by definition causes the eviction point at the lowest ranked position, different eviction points are possible in other replacement schemes.

Read promotions and insertions are, in the illustrated embodiment, both accompanied by a shift to the right (indicated by the dashed promotion shift direction) for other elements depending on the initial position of the hit cache line. After a cache hit, the cache lines between the cache line previously at position 0 and the initial position of the hit cache line are each shifted (or demoted) one position. For example, the promotion of node 3 from position 3 to position 0 will cause the shifting of node 0 from position 0 to position 1, node 1 from position 1 to position 2, and node 2 from position 2 to position 3. Similarly, during a cache miss, all cache lines between position 0 and 6 are shifted one position to the right.

IPV 50A, in the illustrated embodiment, is a "characteristic vector" of transition graph 400. Each vector element 420-0 to 420-7 of IPV 50A contains a promotion value P0-7 corresponding to read promotions 406-0 to 406-7, respectively. Furthermore, IPV 50A contains insertion value 424 corresponding to insertion point 412. As IPV 50A implements an LRU replacement scheme, all values indicate a promotion or insertion to MRU position 0.

IPV 50A may, in some embodiments, be stored in a clocked storage device (e.g., a register file) and accessed using input addresses. Accordingly, IPV 50A may be accessed to determine the promotion value for a current position when the current position is provided as an input. For example, a read request that is a cache hit at position N will output the promotion position (PN) stored at position N within IPV 50A, while a write request that is a cache miss will output the value in element I, which is the insertion position (in this case, position 0).

IPV 50A may, in some embodiments, contain additional types of information. For example, eviction value E (dashed vector element 425) represents the position of the cache line to be evicted after a cache line is inserted. In the following embodiment, the eviction point of an LRU scheme necessarily causes the eviction of the least recently used element (at position 7). But in other embodiments, eviction value E may be used to implement a different (e.g., MRU) scheme.

Figure 4B:
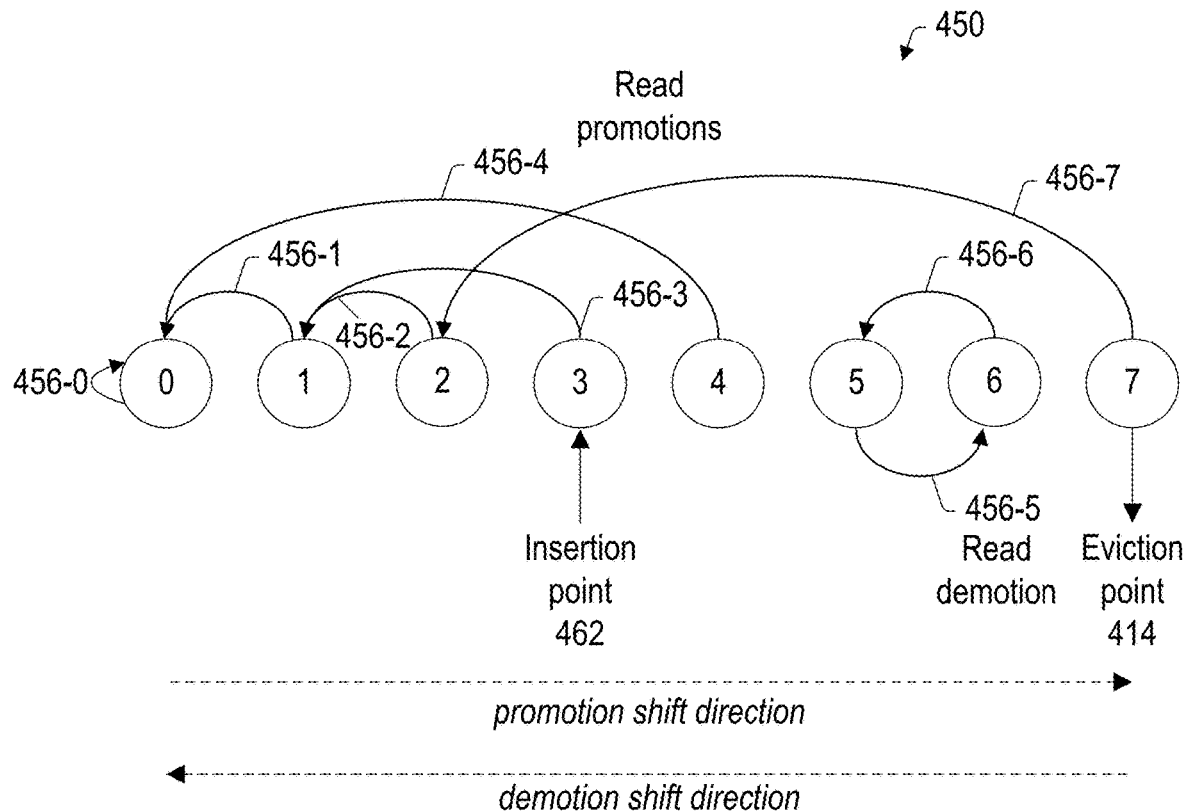
Figure 4B:
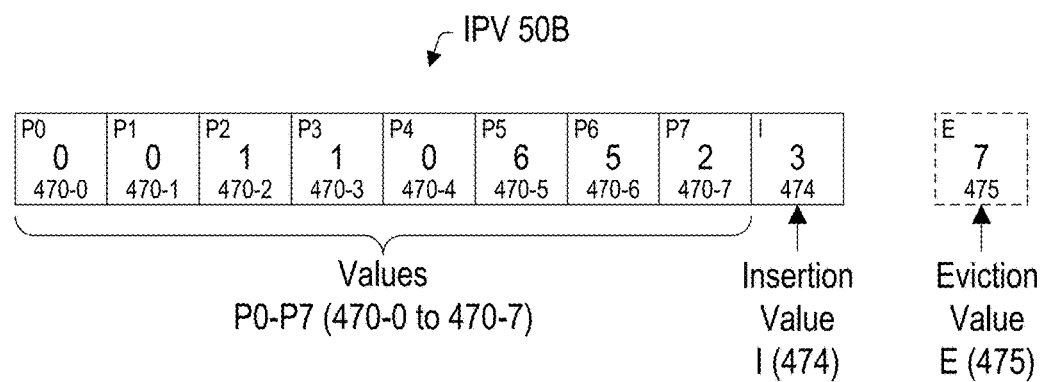

FIG. 4B illustrates exemplary transition paths and insertion/promotion vectors for a non-LRU replacement scheme. Transition graph 450, as shown, depicts a insertion, promotion, and demotion operations for different cache lines; note that cache lines that are accessed are thus not necessarily promoted to MRU position 0 anymore. For example, a cache hit at 3 causes a read promotion 456-3 from position 3 to position 1, as opposed to the same cache hit at 3 for transition graph 400, which instead caused a read promotion 406-0 from position 3 to MRU position 0. Similarly, a cache miss will cause an insertion at position 3 (as opposed to position 0 in graph 400).

Graph 450, unlike graph 400, includes an example of a read demotion (indicated by reference numeral 456-5). (But the behavior of promotions 456 456-0 to 456-4 and 456-0 to 456-7, insertion point 462, and eviction point 414 is similar in behavior to their equivalents in transition graph 400.) While the right shift for read promotion and insertion operations is identical between graphs 400 and 450, read demotions, on the other hand, cause a left shift (indicated by the dashed shift direction) for cache lines corresponding to nodes between the current position and the demotion position, meaning they become "less replaceable" than the demoted cache line.

IPV 50B is a characteristic vector of non-LRU transition graph 450. Each vector element 470-0 to 470-7 contains a promotion/demotion value PN corresponding to read promotions/demotions 470-1 to 470-7, respectively. Vector element 424 contains an insertion value I. IPV 50B may, in some embodiments, also have an eviction element, represented by the dashed element 475 containing eviction value E. Furthermore, IPV 50B may, in some embodiments, similarly be implemented as a clocked storage device that is addressed to output the promotion/values 470-1 to 470-7 and insertion value 474 in a manner similar to IPV 50A. Note that while values in IPV50B values are not all 0, the replacement scheme can still be said to exhibit LRU-like behavior. Elements in low positions are generally promoted to 0, while elements in high positions (near eviction) generally stay in place and are not highly promoted.

In some embodiments, transition graphs and their characteristic IPVs may comprise additional or fewer elements. A change in the number of cache lines of replacement data 32 may require the addition (or removal) of graph nodes/IPV elements depending on the use case. For example, a larger cache size may require more elements to be ranked and therefore cause the size of the IPV to accordingly increase.

As has been discussed, different IPVs may be used to enforce different cache behaviors and bias the cache differently. For example, an IPV for critical data may be more favorable to promotions at low positions, while a different IPV for non-critical data may be less favorable to promotions at high positions, causing critical data to be replaced less often than non-critical data. As another example, an IPV for prefetched data (indicated by e.g., prefetch field 42) may be more "LRU-like" than a second IPV for non-prefetched data.

FIG. 5A illustrates an example of how cache data and replacement data can change in response to a particular code sequence. Table 500 shows an example evolution of cache data 26 and replacement data 32 in response to cache hits/misses 510, cache hit location 520, and cache fill data 530 using the LRU replacement scheme defined in FIG. 4A. Of course, in other embodiments, other policies may be implemented for critical data by using e.g., different IPVs, such as will be described with respect to FIG. 5B.

Each row 511 in table 500 corresponds to a different instruction and thus a different corresponding cache access. Hits/misses 510 describe whether a particular cache access results in a hit or a miss. Cache hit location 520, specifies the cache line data within a set of cache lines that is hit in a hit instruction. Conversely, cache fill data 530 specifies a reference for the new data to be filled into the cache after a cache miss.

Cache data 26 displays an example set of 8 cache lines, labeled A-H. Replacement data 32 contains the values of cache data 26 ranked in order of least to most replaceable. As previously noted, the width of replacement data 32 may vary according to the width of cache data 26. The top row of table 500 depicts cache data 26 and replacement data 32 before any cache instruction modifies either element. Subsequent rows of table 500 depict cache data 26 and replacement data 32 after each instruction 511A-G. Note that hits 511A, 511B, 511D, 511E, and 511G affect replacement data 32 (but not cache data 26), but only misses 511C and 511F affect both replacement data 32 and cache data 26.

IPV50A's replacement scheme exhibits two possible behaviors (promotion or insertion) depending on whether or not an instruction results in a hit. For example, instruction 511A is a hit at E (position 4); the cache line at position 4 is thus promoted to position 0 and cache lines between positions 1 and 3 are shifted to the right as shown in the corresponding row of replacement data 32. Instruction 511B is also a hit at the same location. On the other hand, instruction 511C is a miss, and results in cache fill data I. The LRU value (H at position 7 of the replacement data and position 7 of cache data 26) is evicted from both cache data 26 and replacement data 32. The new cache line (I) is inserted at position 0 of replacement data 32 (indicating MRU status) and at position 7 of cache data 26, effectively replacing the evicted element (H). Subsequent instructions 511D-G show the outcome of several additional accesses.

FIG. 5B illustrates another example of how cache data and replacement data can change in response to a particular code sequence, this time with reference to a different IPV. Table 550 shows an example evolution of cache data 26 and replacement data 32 in response to cache hits/misses 510, cache hit location 520, and cache fill data 530 using the non-LRU replacement scheme defined in FIG. 4B.

The top row of table 550 depicts cache data 26 and replacement data 32 before any cache instruction 512 modifies either element. Subsequent rows of table 550 depict cache data 26 and replacement data 32 after each instruction 512A-G. Note that hits 512A, 512B, 512D, 512E, and 512G affect replacement data 32 (but not cache data 26), while misses 512C and 512F affect both replacement data 32 and cache data 26.

IPV50B's replacement scheme exhibits three possible behaviors (promotion, demotion, or insertion) depending on whether or not an instruction results in a hit and whether the replacement position is larger than the initial position. For example, instruction 512A is a hit at position 4; the cache line at position 4 (E) is thus promoted to position 0 and cache lines from positions 1 to 3 are shifted to the right as shown in the corresponding row of replacement data 32. Instruction 512B is also a hit at the same position. Instruction 512C is a miss, and results in cache fill data I. The LRU value (H at position 7) is evicted from both cache data 26 and replacement data 32. The new cache line (I) is inserted at position 3 of replacement data 32 (as opposed to position 0 in FIG. 5A) and at position 7 of cache data 26, effectively replacing the evicted element (H). Instruction 512D is a hit that promotes F from position 6 to position 5 (unlike instruction 511D, which promotes F from position 6 to MRU position 0). Demotion is also shown in this example: instruction 512G is a hit that demotes G from position 5 to position 6. Other instructions show the outcome of several additional accesses.

Figure 6:
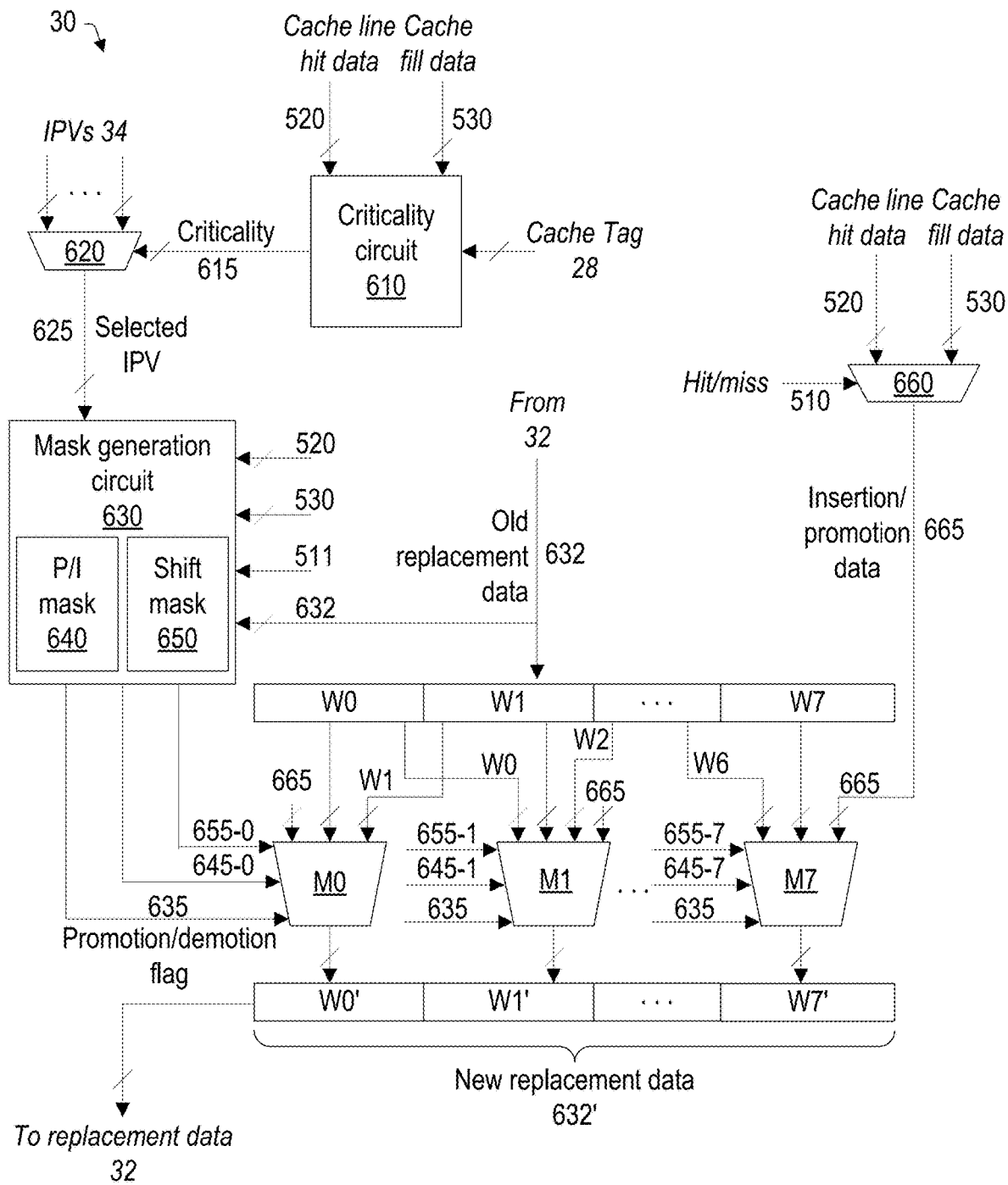
FIG. 6 is a block diagram of one embodiment of a replacement control circuit.

FIG. 6 is a block diagram of one embodiment of internals of replacement control circuit 30. Replacement control circuit 30, in the illustrated embodiment, is configured to maintain replacement data 32 based on a selected one of IPVs 34. As shown, control circuit 30 includes criticality circuit 610, mask generation circuit 630, old replacement data 632, new replacement data 632', and various multiplexers including 620, 660, and M0-M7.

Control circuit 30 maintains replacement data 32 by receiving old replacement data 632 and outputting new replacement data 632' back to replacement data 32. In the depicted embodiment, control circuit 30 selects an appropriate IPV 625 based on the criticality of the cache line being accessed and then determines the new replacement data 632' according to the instruction and selected IPV.

Old (or current) replacement data 632 is composed of elements W0-W7 each containing an element of replacement data 32 prior to cache access instruction 511. New replacement data 632' is generated by a series of multiplexers M0-M7, one for each element W0-7. Generally speaking, a given multiplexer Mn (where n is 0-7) may have up to 4 inputs. Three of these inputs are Wn−1 (if applicable), Wn, and Wn+1 (if applicable). (M0 will not have Wn−1 as an input, and M7 will not have Wn+1 as an input.) The fourth input is promotion/insertion data 665, which is either the cache line being promoted (or demoted) or the cache line that is inserted based on a cache miss. Old replacement data 632 may be stored using a sequence of registers or other clocked storage devices, in some embodiments. Multiplexers M0-7 can select from these inputs using promotion/demotion flag 635 and masks 640 and 650. These values 635, 640, and 650 are generated by mask generation circuit 630 based on selected IPV 625.

Criticality circuit 610, as shown, is configured to use cache hit data 520, fill data 530 and cache tag 28 to determine a criticality value 615 of the cache line that is currently being accessed. Criticality value 615 may, in some embodiments, be one bit indicating whether the cache line critical or non-critical. In other embodiments, the criticality has more bits to encode multiple increasing levels of criticality. Multiplexer 620 is configured to select an IPV 625 out of IPVs 34 based on criticality value 615.

Mask generation circuit 630, in the illustrated embodiment, is configured to receive cache instruction 511, cache hit location 520, cache fill data 530, old replacement data 632, and selected IPV 625. In response, circuit 630 outputs, in one embodiment, promotion/demotion flag 635, promotion/insertion mask 640 (including bits 645-0 to 645-7), and shift mask 650 (including bits 655-0 to 655-7). These values are supplied to multiplexers M0-M7 in order to select new replacement values W0'-W7'. In some embodiments, values 511, 520, and 530 are received from cache 12.

Promotion/Demotion flag 635 specifies whether a promotion (e.g., instruction 511E) or a demotion (e.g., instruction 511G) is indicated by the relevant vector position in IPV 50. Promotion/demotion flag 635 may, in some embodiments, be determined by comparing the previous position of the hit cache line to the new position of that cache line output by accessing selected IPV 625. For example, if cache line E was previously at position 4 and is promoted to position 0, the fact that the value of the previous position (4) is greater than the promotion position (0) can be used to set promotion/demotion flag to 1, indicating a promotion. In one implementation, the promotion/demotion flag 635 is one bit wide and describes whether there is a promotion (value 1) or a demotion (value 0).

Unless IPV 625 indicates that a particular cache hit causes no promotion or demotion (e.g., when a cache hit to location 0 keeps that data in LRU status), there will be a promotion, a demotion, or a cache fill (in the event of a miss). Promotion/insertion (P/I) mask 640 thus indicates which element of replacement data 32 (if any) is to be replaced with either hit data 520 (in response to a promotion/demotion) or fill data 530 (in response to a cache miss). P/I mask 640 may indicate the promotion/insertion position by setting the corresponding bit at that position to 1. A given instance of P/I mask 640 will thus have at most one bit that is set at a given time in some implementations. Mask generation circuit 630 may use instruction 511 to determine if a hit or a miss has occurred. If instruction 511 is a hit (causing promotion/demotion), the promotion position is equal to the IPV value of the position that led to the hit (which indicates the promotion position). If instruction 511 is instead a miss (causing an insertion), circuit 630 determines the replacement position using the insertion position indicated by selected IPV 625.

Shift mask 655, on the other hand, contains bits indicating which elements of replacement data are to be shifted as a result of a cache access. Shift mask 655 may indicate the positions that receive shifted values by setting those values to 1s. If an instruction results in a hit and there is a promotion, circuit 630 can set all bits in shift mask 655 starting from one position after the promotion position up to and including the current hit location. Thus, if a cache line in location 5 is promoted to location 2, bits corresponding to locations 3-5 in 655 are set, with the other bits unset. (P/I mask 640 will indicate location 2.) On the other hand, if an instruction results in a hit and there is a demotion, circuit 630 can set all bits starting from the current location up to one bit before the demotion location. Thus, if a cache line in location 3 is demoted to location 5, bits in mask 655 corresponding to locations 3-4 may be set, with the other bits unset. (P/I mask 640 will indicate location 5.) If an instruction instead results in a cache miss and thus indicates an insertion, circuit 630 sets all bits in shift mask 655 having positions higher than the insertion position.

After masks 640 and 650 are generated, mask generation circuit 630 outputs each mask bit 645-0 to 645-7 in mask 640 and bits 655-0 to 655-7 in mask 650 to respective multiplexers M0-M7. Mask generation circuit 630 also outputs promotion/demotion flag 635 to distinguish between a promotion and a demotion in the case of a shift of values in individual bits of new replacement data 632'.

Table 1 illustrated below shows a number of possible values for promotion/demotion 635, P/I mask 645, and shift mask 655. The first row indicates a promotion from location 6 to location 4. The second row indicates a promotion from location 7 to location 2. The third row indicates a demotion from location 3 to location 7.

TABLE 1

| Promotion/ Demotion 635 | Beginning Shift Position | Ending Shift Position | P/I mask 645 (0-7) | Shift mask 655 (0-7) |
|---|---|---|---|---|
| 1 (Promotion) | 5 | 6 | 0000 1000 | 0000 0110 |
| 1 (Promotion) | 3 | 7 | 0010 0000 | 0001 1111 |
| 0 (Demotion) | 3 | 6 | 0000 0001 | 0001 1110 |

Multiplexer (MUX) 660, in the illustrated embodiment, determines the appropriate value to insert at the insertion/promotion position. As shown, MUX 660 selects promotion/insertion (P/I) data 665 as either cache line hit data 520 or cache fill data 530 based on instruction hit/miss 510. If the instruction is a hit, MUX 660 selects cache line hit data 520 as P/I data 665. Otherwise, if the instruction is a miss, MUX 660 selects cache line fill data 530 instead.

New replacement data 632', as previously described, represents new replacement data that is sent back to replacement data 32 for updating. In the illustrated embodiment, the value of each element W0'-W7' in new replacement data 632' is determined by multiplexers M0-M7 that select from several possible inputs. Each entry of replacement data 632 at index i (Wi') may, in the illustrated embodiment, take four possible values (as noted, W0' and W7' take three possible values) depending on the values of the select signals 635, 645, and 655. First, in the case of an insertion or a replacement at position i, Wi' takes the value of promotion/insertion data 665. Second, if another element is promoted and the element at i is to be shifted right, the value Wi becomes Wi−1 due to the demotion of the element in Wi−1 from position i−1 to position i. Third, if another element is demoted and the value at i is to be shifted left, the value of Wi becomes Wi+1 due to the promotion of the element in Wi+1 from position i+1 to position i. Fourth, the value of Wi will not change if respective mask bits 645-$i$ and 655-$i$ indicate that the element at that position is neither promoted/demoted nor inserted.

Table 2 summarizes the selection behavior of each MUX Mi according to the preceding description. For a given multiplexer input in the first column, the values in the corresponding three rightmost columns indicate when such input is selected. As shown, the behavior of each MUX depends on the values of promotion insertion mask bit 655-$i$, shift mask bit 655-$i$, and promotion/demotion flag 635.

TABLE 2

| Wi value | Promotion/ Insertion mask bit 645-i | Shift mask bit 655-i | Promotion/ demotion flag 635 |
|---|---|---|---|
| Insertion/ promotion data 655 | 1 | 0 | X |
| Wi (no change) | 0 | 0 | X |
| Wi + 1 (right shift) | 0 | 1 | 1 |
| Wi − 1 (left shift) | 0 | 1 | 0 |

The updating of replacement data 32 may trigger a corresponding update of cache data 26 when a miss occurs. Otherwise, replacement data 32 may continue being updated until a cache miss does occur, at which time, cache 12 will be synced to replacement data 32.

Example Method

Figure 7:
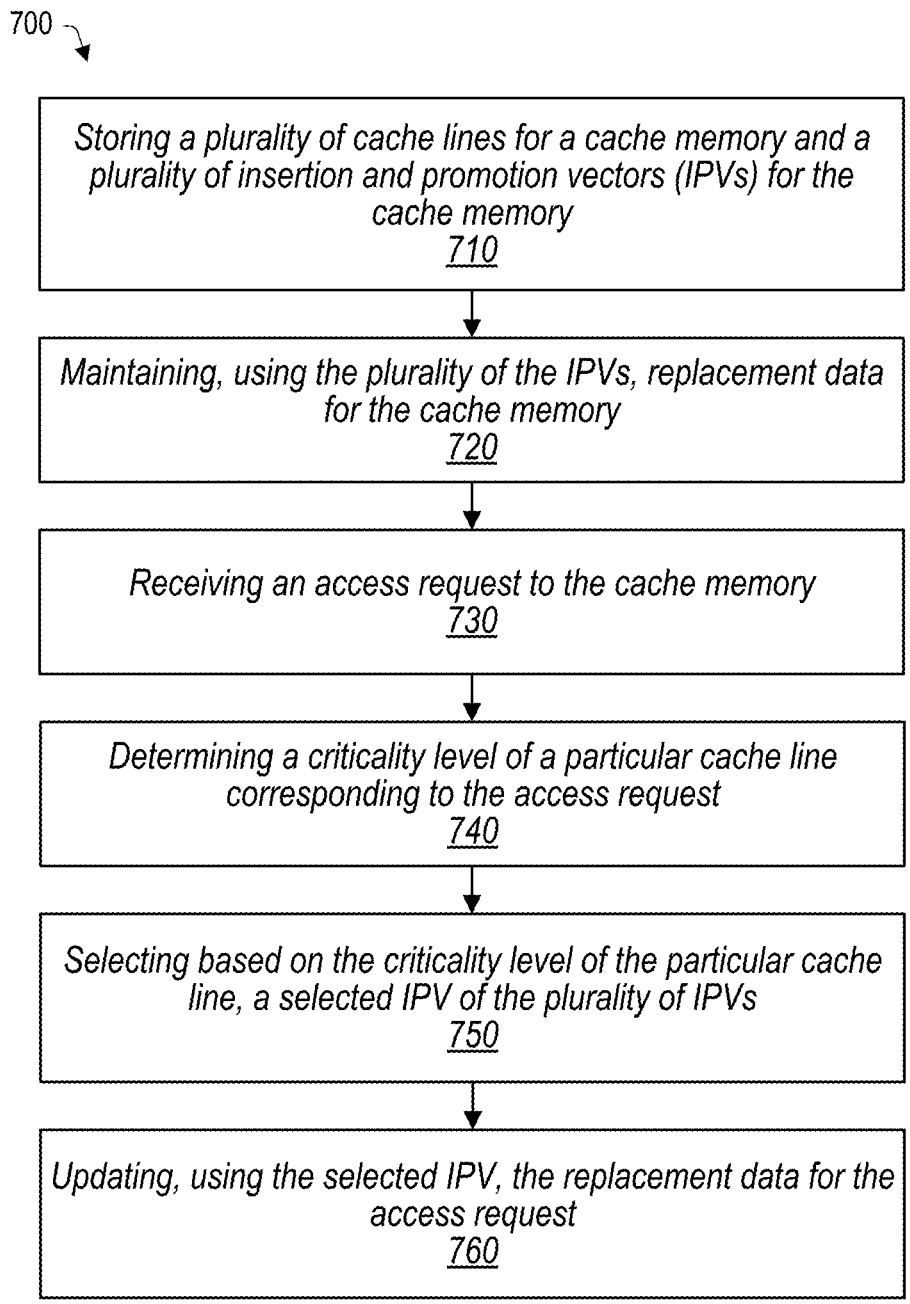
FIG. 7 is a flow diagram illustrating one embodiment of method for selecting an insertion/promotion vector based on a criticality level.

FIG. 7 is a flow diagram of one embodiment of a method 700 for replacing accessed cache lines using IPVs selected based on cache line criticality. In various embodiments, method 700 is performed in a cache such as cache 12.

Method 700 commences in step 710, in which a computer system stores a plurality of cache lines (e.g., cache data 28) for a cache memory (e.g., cache 12) and a plurality of insertion and promotion vectors (IPVs) (e.g., IPVs 34) for the cache memory. A given IPV can store any suitable replacement scheme, including a least recently used (LRU) replacement scheme or a non-LRU replacement scheme.

Method 700 continues in step 720, in which the computer system maintains, using the plurality of IPVs, replacement data (e.g., replacement data 32) for the cache memory. The replacement data may rank the plurality of cache lines from most replaceable to least replaceable, and the selected IPV comprises a vector element for each position in the rank and identifies a promotion (or demotion) position in the rank when a cache line of the cache lines having the rank is accessed. Accordingly, a replacement control circuit (e.g., replacement control circuit 30) is configured to update the rank to promote (or demote) the cache line to the promotion position in response to the given request accessing the cache line. In some embodiments, the selected IPV further comprises an additional vector element that specifies an insertion position in the rank for a cache line that is being stored into the cache, in order to replace one of the plurality of cache lines in the cache. Accordingly, the replacement control circuit is configured to insert a missing cache line into the cache with the position in the replacement data indicated by the insertion position in response to the given request to access the cache line.

Next, in step 730, the computer system receives an access request to the cache memory. The access request may, in some embodiments, be generated by a request circuit (e.g., instruction prefetch circuit 14, IMMU 16, LSU 20, DMMU 22, and data prefetch circuit 22).

Next, in step 740, the computer system determines a criticality level of a particular cache line corresponding to the access request. Then, in step 750, the computer system selects, based on a criticality level (e.g., indicated by criticality field 44) of the particular cache line, a selected IPV of the plurality of IPVs to update the replacement data for the request.

Different IPVs may be used for different levels of criticality. For example, in some embodiments, a first of the plurality of IPVs has a criticality level indicating criticality greater than non-critical and a second of the plurality of IPVs has a criticality level indicating non-critical. In some embodiments, the criticality level indicates a non-critical level and two or more increasingly critical levels, and respective IPVs correspond to respective ones of the two or more increasingly critical levels. Alternatively, the criticality level is usable to indicate a non-critical level and two or more increasingly critical levels, and a given IPV is shared by a plurality of the two or more increasingly critical levels. Finally, in step 760, the computer system updates, using the selected IPV, the replacement data for the access request.

Example Device

Figure 8:
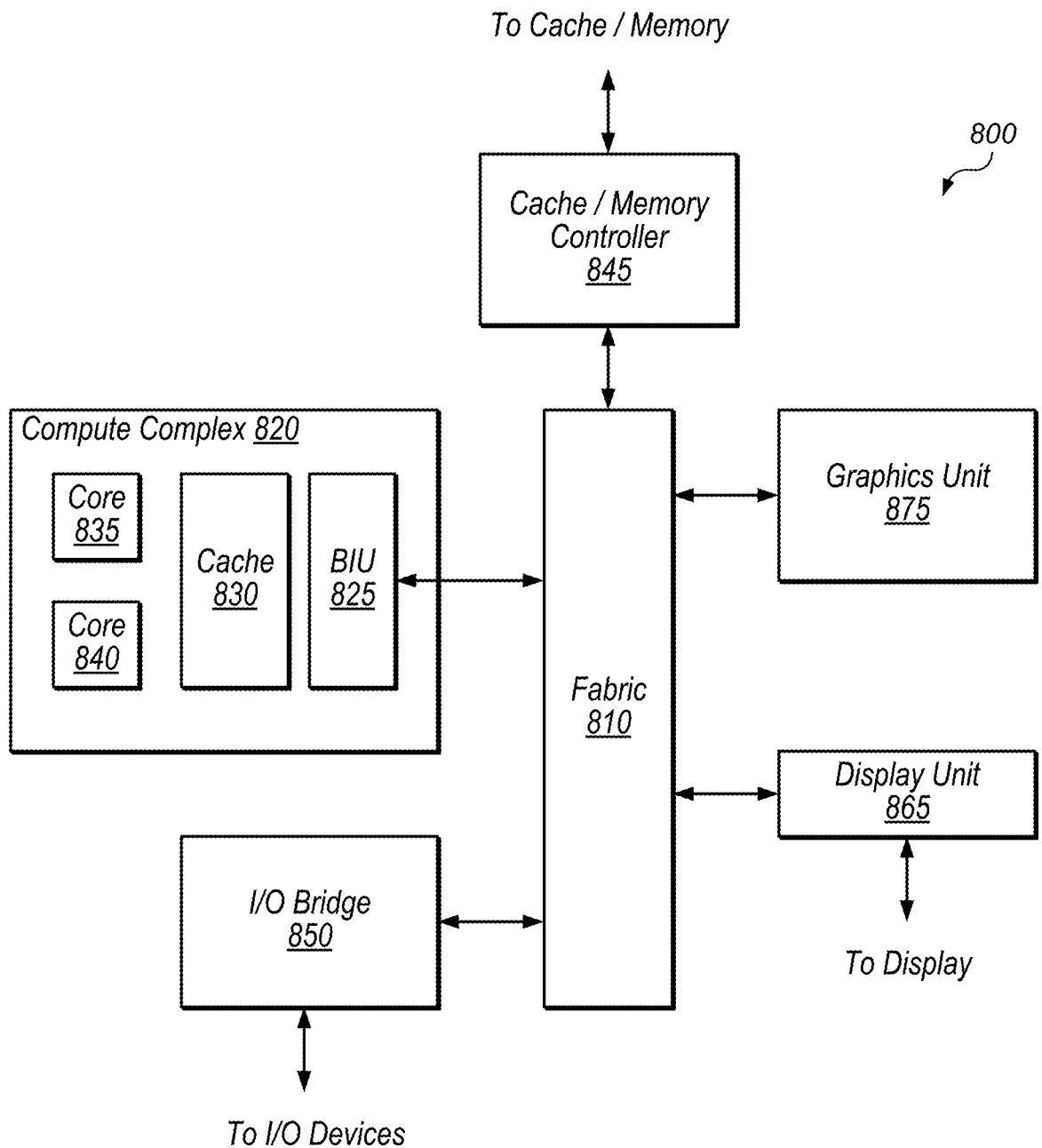
FIG. 8 is a block diagram illustrating an example computing device for implementing the disclosed techniques.

Referring now to FIG. 8, a block diagram illustrating an example embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 875, and display unit 865. In some embodiments, device 800 may include other components (not shown) in addition to or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions. These instructions may be stored in computer readable medium such as a memory coupled to memory controller 845 discussed below. The subject matter of the present application may be found within computer complex 820 in various embodiments.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Cache/memory controller 845 may be configured to manage transfer of data between fabric 810 and one or more caches and memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches. Memory coupled to controller 845 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 845 may be any type of non-volatile memory such as NAND flash memory, NOR flash memory, nano RAM (NRAM), magneto-resistive RAM (MRAM), phase change RAM (PRAM), Racetrack memory, Memristor memory, etc.

Graphics unit 875 may include one or more processors, e.g., one or more graphics processing units (GPUs). Graphics unit 875 may receive graphics-oriented instructions, such as OPENGL®, Metal®, or DIRECT3D® instructions, for example. Graphics unit 875 may execute specialized GPU instructions or perform other operations based on the received graphics-oriented instructions. Graphics unit 875 may generally be configured to process large blocks of data in parallel and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (I2C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 800 with connectivity to various types of other devices and networks.

Example Applications

Figure 9:
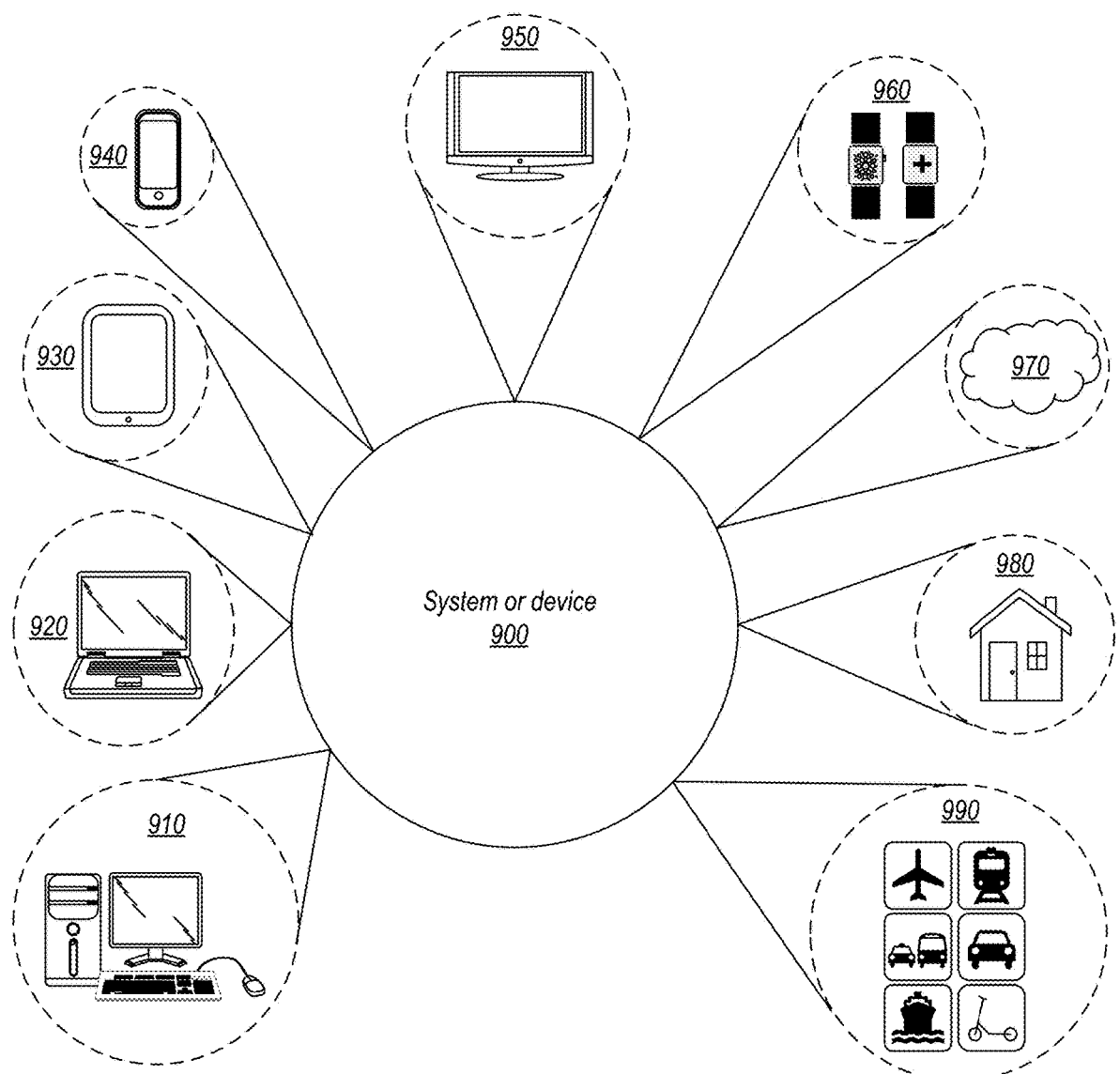
FIG. 9 is a diagram illustrating example applications for systems and devices employing the disclosed techniques.

Turning now to FIG. 9, various types of systems that may include any of the circuits, devices, or system discussed above. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 10:
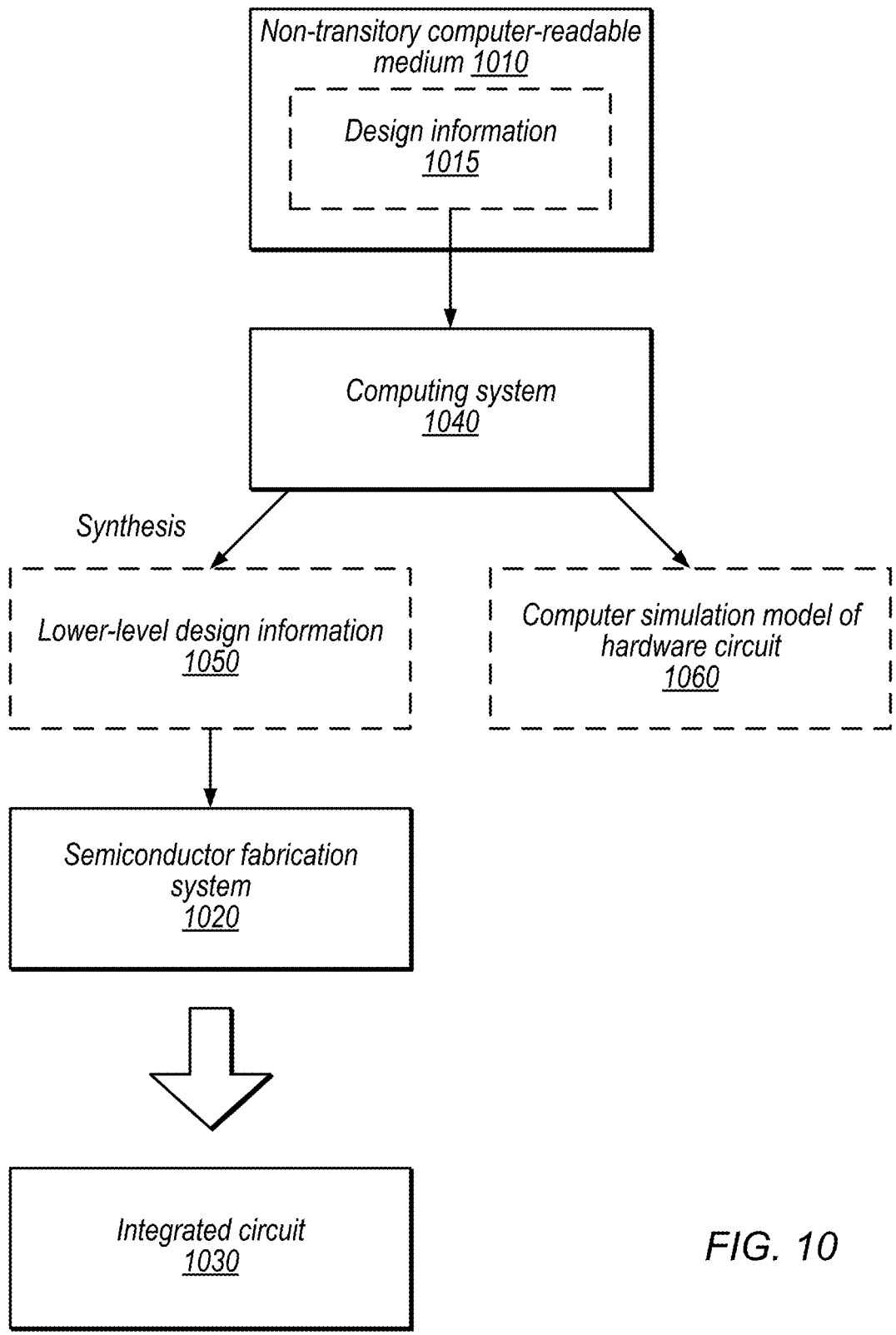
FIG. 10 is a block diagram illustrating an example computer-readable medium that stores circuit design information for implementing devices that employ the disclosed techniques.

FIG. 10 is a block diagram illustrating an example non-transitory computer-readable storage medium that stores circuit design information, according to some embodiments. In the illustrated embodiment, computing system 1040 is configured to process the design information. This may include executing instructions included in the design information, interpreting instructions included in the design information, compiling, transforming, or otherwise updating the design information, etc. Therefore, the design information controls computing system 1040 (e.g., by programming computing system 1040) to perform various operations discussed below, in some embodiments.

In the illustrated example, computing system 1040 processes the design information to generate both a computer simulation model of a hardware circuit 1060 and lower-level design information 1050. In other embodiments, computing system 1040 may generate only one of these outputs, may generate other outputs based on the design information, or both. Regarding the computing simulation, computing system 1040 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1040 also processes the design information to generate lower-level design information 1050 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1050 (potentially among other inputs), semiconductor fabrication system 1020 is configured to fabricate an integrated circuit 1030 (which may correspond to functionality of the simulation model 1060). Note that computing system 1040 may generate different simulation models based on design information at various levels of description, including information 1050, 1015, and so on. The data representing design information 1050 and model 1060 may be stored on medium 1010 or on one or more other media.

In some embodiments, the lower-level design information 1050 controls (e.g., programs) the semiconductor fabrication system 1020 to fabricate the integrated circuit 1030. Thus, when processed by the fabrication system, the design information may program the fabrication system to fabricate a circuit that includes various circuitry disclosed herein.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Accordingly, non-transitory computer-readable storage medium 1010 may include two or more memory media; such media may reside in different locations—for example, in different computer systems that are connected over a network.

Design information 1015 may be specified using any of various appropriate computer languages, including hardware description languages such as, without limitation: VHDL, Verilog, SystemC, SystemVerilog, RHDL, M, MyHDL, etc. The format of various design information may be recognized by one or more applications executed by computing system 1040, semiconductor fabrication system 1020, or both. In some embodiments, design information may also include one or more cell libraries that specify the synthesis, layout, or both of integrated circuit 1030. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1030 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 and model 1060 are configured to operate according to a circuit design specified by design information 1015, which may include performing any of the functionality described herein. For example, integrated circuit 1030 may include any of various elements shown in FIGS. 1, 2, and 6. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1020 to fabricate integrated circuit 1030.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus comprising:
  a cache memory configured to store a plurality of cache lines;
  a plurality of clocked storage devices configured to store a plurality of insertion and promotion vectors (IPVs); and
  a replacement control circuit coupled to the cache memory and to the plurality of clocked storage devices, wherein:
    the replacement control circuit is configured to maintain replacement data corresponding to the cache memory based on the plurality of IPVs, and
    the replacement control circuit is configured to select a selected IPV of the plurality of IPVs to update the replacement data for a given access request to the cache memory based on a criticality level of a particular cache line accessed by the given access request.

2. The apparatus of claim 1, wherein:
  the replacement data stores information usable to specify a rank of the plurality of cache lines from most replaceable to least replaceable;
  the selected IPV comprises a vector element for each position in the rank, a given vector element identifying a promotion position in the rank; and
  the replacement control circuit is configured to update the rank to promote the particular cache line to an identified promotion position in response to the given access request.

3. The apparatus of claim 2 wherein:
  the selected IPV further comprises an additional vector element that specifies an insertion position in the rank for a cache line that is being stored into the cache memory in response to a cache miss; and
  the replacement control circuit is configured to insert a missing cache line into the cache memory at the insertion position in response to the given access request.

4. The apparatus of claim 1, wherein a first of the plurality of IPVs corresponds to a criticality level indicating criticality greater than non-critical and a second of the plurality of IPVs corresponds to a criticality level indicating non-critical status.

5. The apparatus of claim 4, wherein the plurality of IPVs include respective IPVs for a non-critical level and two or more increasingly critical levels.

6. The apparatus of claim 4, wherein the plurality of IPVs include a first IPV for a first criticality level indicating non-critical status and a second IPV shared by at least two levels of criticality indicating increasing levels of criticality.

7. The apparatus of claim 4, wherein the first IPV specifies a least recently used (LRU) replacement scheme.

8. The apparatus of claim 7, wherein the second IPV specifies a non-LRU replacement scheme.

9. A method comprising:
  storing, by a computing device, a plurality of cache lines for a cache memory and a plurality of insertion and promotion vectors (IPVs) for the cache memory;
  maintaining, by the computing device using the plurality of the IPVs, replacement data for the cache memory;
  receiving, by the computing device, an access request to the cache memory;
  determining, by the computing device, a criticality level of a particular cache line corresponding to the access request;
  selecting, by the computing device based on the criticality level of the particular cache line, a selected IPV of the plurality of IPVs; and
  updating, by the computing device using the selected IPV, the replacement data for the access request.

10. The method of claim 9, wherein:
  the replacement data specifies a rank of the plurality of cache lines from most replaceable to least replaceable; and
  the selected IPV comprises a vector element for each position in the rank and is usable to identify a promotion position in the rank when a cache hit occurs for the particular cache line.

11. The method of claim 10, further comprising updating, by the computing device, the rank to promote the particular cache line to the promotion position in response to the access request resulting in a hit.

12. The method of claim 10, wherein:
  the selected IPV further comprises an additional vector element that specifies an insertion position in the rank for a cache line that is being stored into the cache memory to replace one of the plurality of cache lines; and
  wherein the method further comprises:
    inserting, by the computing device, a new cache line into the plurality of cache lines at the insertion position in response to the access request resulting in a miss.

13. The method of claim 9, wherein at least one of the plurality of IPVs has a criticality level indicating criticality greater than non-critical and at least one other one of the plurality of IPVs has another criticality level indicating non-critical status.

14. The method of claim 9, wherein respective IPVs correspond to respective ones of two or more increasingly critical levels.

15. The method of claim 9, wherein a given cache line can be denoted as having a criticality level selected from one of two or more increasingly critical levels, wherein at least one IPV is shared by a plurality of the two or more increasingly critical levels.

16. A non-transitory computer readable storage medium having instructions of a hardware description language stored thereon, wherein the instructions are executable by a computing system to program the computing system to generate a computer simulation model, wherein the computer simulation model represents a hardware circuit that includes:
  a cache memory configured to store a plurality of cache lines;
  a plurality of clocked storage devices configured to store a plurality of insertion and promotion vectors (IPVs); and a replacement control circuit coupled to the cache memory and to the plurality of clocked storage devices, wherein:
the replacement control circuit is configured to maintain replacement data corresponding to the cache memory based on the plurality of IPVs, and
the replacement control circuit is configured to select a selected IPV of the plurality of IPVs to update the replacement data for a given access request to the cache memory based on a criticality level of a particular cache line accessed by the given access request.

17. The non-transitory computer readable storage medium of claim 16, wherein:
the replacement data stores information usable to specify a rank of the plurality of cache lines from most replaceable to least replaceable;
the selected IPV comprises a vector element for each position in the rank, a given vector element identifying a promotion position in the rank; and
the replacement control circuit is configured to update the rank to promote the particular cache line to an identified promotion position in response to the given access request.

18. The non-transitory computer readable storage medium of claim 17, wherein:
the selected IPV further comprises an additional vector element that specifies an insertion position in the rank for a cache line that is being stored into the cache memory to replace one of the plurality of cache lines in the cache memory; and
the replacement control circuit is configured to insert a missing cache line into the cache memory at the position in the replacement data indicated by the insertion position in response to the given access request accessing the cache line.

19. The non-transitory computer readable storage medium of claim 16,
wherein a first of the plurality of IPVs is associated with a criticality level indicating criticality greater than non-critical and a second of the plurality of IPVs is associated with a criticality level indicating non-critical status.

20. The non-transitory computer readable storage medium of claim 16, wherein:
the criticality level is usable to specify a non-critical level and two or more increasingly critical levels; and
respective IPVs correspond to respective ones of the two or more increasingly critical levels.

\* \* \* \* \*